No. 725,852. PATENTED APR. 21, 1903.
G. E. LATTIMER.
BRIDLE CHECK.
APPLICATION FILED JULY 24, 1902.
NO MODEL.
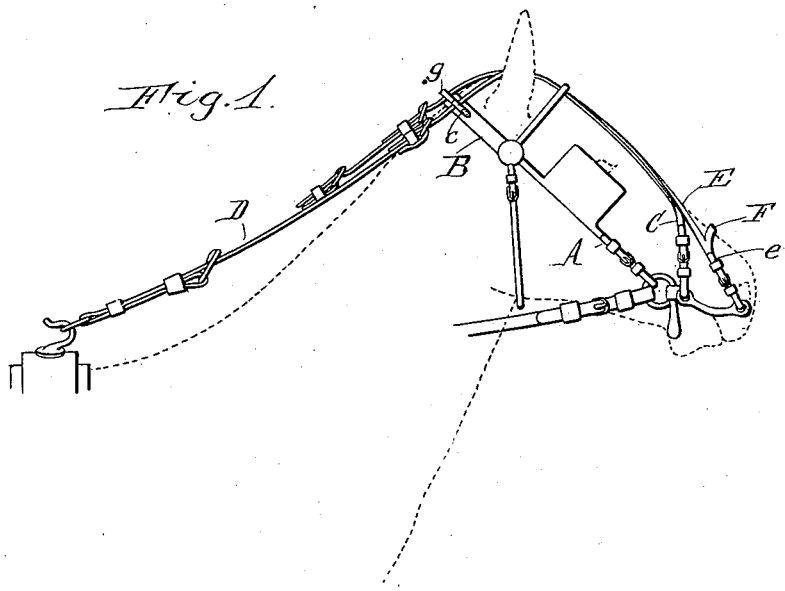
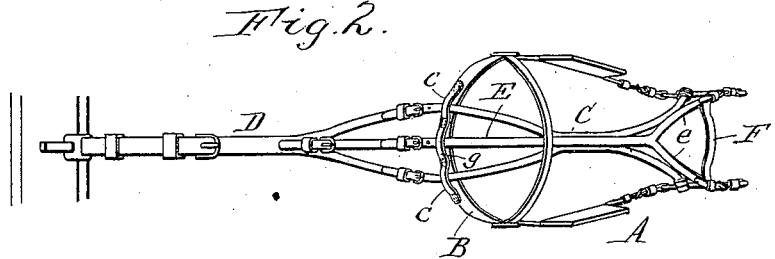
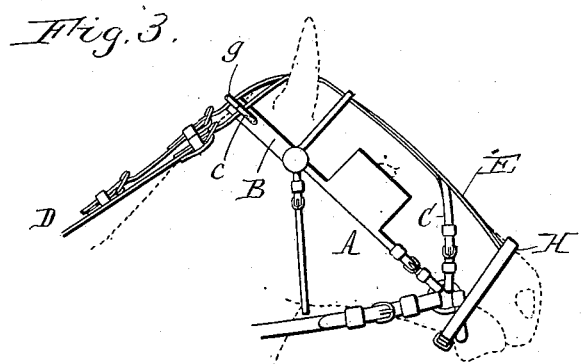
Witnesses:
E. A. Volk.
J. W. Snyder Jr.
George E. Lattimer Inventor.
By Wilhelm Bonner
Attorneys.

UNITED STATES PATENT OFFICE.

GEORGE E. LATTIMER, OF BUFFALO, NEW YORK.

BRIDLE-CHECK.

SPECIFICATION forming part of Letters Patent No. 725,852, dated April 21, 1903.

Application filed July 24, 1902. Serial No. 116,828. (No model.)

*To all whom it may concern:*

Be it known that I, GEORGE E. LATTIMER, a citizen of the United States, residing at Buffalo, in the county of Erie and State of New York, have invented new and useful Improvements in Bridle-Checks, of which the following is a specification.

This invention relates to an overdraw-check or attachment for the same intended to stop a horse from pulling, tongue-lolling, lugging down, &c. Devices have heretofore been designed with a view to accomplishing this result in which a nose-strap or similar device is connected to the crown-piece of the bridle and to the bit or otherwise held in position on the horse, so that in pulling, lugging down, &c., the nose-piece pinches or presses on the animal's nose. These devices being connected to the crown-piece pull the latter forward, so as to pinch the horse's ears and irritate or make the horse restive.

The object of the present invention is to provide a simple attachment for the purpose stated which will hold the crown-piece back clear of the ears at all times, so that the horse is not irritated or fretted.

In the accompanying drawings, Figure 1 is a side view showing a bridle and overdraw-check provided with an attachment embodying the invention. Fig. 2 is a plan view thereof. Fig. 3 is a side view showing an attachment of slightly-different form.

Like letters of reference refer to like parts in the several figures.

A represents a bridle of any approved style and having the usual crown-piece B, which passes over the horse's head back of the ears.

C represents an overdraw-check of ordinary construction, the lower end of which is branched and attached to the rings of the driving or check bit. The portion of the check passing over the head of the horse is divided and slides through separated loops or guides c on the crown-piece B. The rear ends of the upper divided portion are connected to the branched forward end of the checkrein D, which connects, as usual, with the check-hook on the saddle.

The attachment in the form shown in Figs. 1 and 2 comprises a strap E, the lower end of which is provided with branches e, which extend downwardly at the sides of the horse's nose and are buckled or otherwise connected to the ends or rings of the check-bit.

F represents a nose-strap, which is attached at its ends to the ends of the branches e and passes over the lower part of the horse's nose. The lower branched end of the strap E may, if preferred, be connected to the rings of the bridle-bit. The upper end of the strap E passes loosely through and is adapted to slide in a suitable loop g, with which the crown-piece is provided, and is buckled or attached in some suitable manner to the checkrein in rear of the crown-piece. Instead of providing the loop g the strap may be passed through the billet-loop of the buckle with which the crown-piece is usually provided or slidably connected to the crown-piece in any other suitable manner.

When the attachment is applied as described, if the horse attempts to pull or lug down the nose-strap will pinch or press on the animal's nose and effectually stop him. Owing to the sliding connection between the strap E and crown-piece, the pulling or jerking on the former cannot draw the crown-piece up against the back of the ears, so as to pinch or chafe the latter or irritate the head in any way. On the contrary, the connection of the strap E with the checkrein holds the crown-piece back clear of the ears at all times. The bridle is thus held in proper place either when the horse takes a hold or in jogging.

Instead of connecting the lower end of the attachment to the bridle or check-bit, as above described, similar results can be secured by connecting the lower end of the strap E to a jaw-strap H, which is fastened by a buckle or other device about the horse's muzzle, as indicated in Fig. 3.

The attachment above described is a valuable adjunct to an overdraw-check, especially for racing-horses, because it maintains the bridle in proper position on the horse's head and prevents it from pinching, chafing, or irritating the horse. The horse being thus relieved of any disagreeable action of the bridle does not fret and can keep his mind on his gait, with the result of a very noticeable increase of speed.

I claim as my invention—

1. An overdraw-check provided with an attachment which is connected at its rear end to the checkrein and has at its forward end a flexible nose-strap adapted to bear on the animal's nose, said attachment being free to move relative to the crown-piece of the bridle with which it is used, substantially as set forth.

2. The combination with a bridle, of an overdraw-check which is movable relative to the crown-piece of the bridle, and an attachment slidably connected to the crown-piece of the bridle and connected at its rear end to the overdraw-checkrein back of the crown-piece of the bridle, and having a flexible nose-strap connected to the forward end of said attachment, substantially as set forth.

3. The combination with a bridle, and an overdraw-check provided with a check-bit, of an attachment slidably connected to the crown-piece of said bridle, having its rear end attached to the checkrein and its forward end attached to the check-bit, and provided with a nose-strap attached to the forward end of said attachment, substantially as set forth.

4. The combination with an overdraw-check, of an attachment therefor provided with a strap connected at its rear end to the checkrein and having a flexible branched forward end adapted to be attached to the check-bit, and a flexible nose-strap connecting the ends of the branches of said first-mentioned strap, substantially as set forth.

Witness my hand this 12th day of July, 1902.

GEORGE E. LATTIMER.

Witnesses:
JNO. J. BONNER,
CLAUDIA M. BENTLEY.